US010129047B2

(12) United States Patent
Voddhi et al.

(10) Patent No.: US 10,129,047 B2
(45) Date of Patent: Nov. 13, 2018

(54) HOME AUTOMATION SYSTEM DEPLOYMENT

(71) Applicant: Time Warner Cable Enterprises LLC, St. Louis, MO (US)

(72) Inventors: Suchitra Voddhi, Chantilly, VA (US); Scott Taylor, Broadlands, VA (US); Mike Roudi, Plano, TX (US); Donald Murtha, Johns Creek, GA (US)

(73) Assignee: TIME WARNER CABLE ENTERPRISES LLC, Saint Louis, MO (US)

(*) Notice: Subject to any disclaimer, the term of this patent is extended or adjusted under 35 U.S.C. 154(b) by 584 days.

(21) Appl. No.: 14/608,479

(22) Filed: Jan. 29, 2015

(65) Prior Publication Data
US 2016/0225240 A1 Aug. 4, 2016

(51) Int. Cl.
H04W 4/38 (2018.01)
H04W 4/02 (2018.01)
H04W 4/029 (2018.01)
G08B 25/14 (2006.01)
G08B 23/00 (2006.01)
G08B 5/36 (2006.01)
G08B 7/06 (2006.01)
G08B 1/08 (2006.01)
H04L 12/28 (2006.01)
H04L 29/08 (2006.01)
(Continued)

(52) U.S. Cl.
CPC .......... H04L 12/2816 (2013.01); G08B 25/08 (2013.01); G08B 25/14 (2013.01); H04L 12/2825 (2013.01); H04L 12/2827 (2013.01); H04L 43/0811 (2013.01); H04L 67/26 (2013.01); H04W 4/029 (2018.02); H04W 4/185 (2013.01); H04W 4/38 (2018.02); H04W 4/02 (2013.01)

(58) Field of Classification Search
CPC .................................................... H04L 12/2816
See application file for complete search history.

(56) References Cited

U.S. PATENT DOCUMENTS

2010/0280635 A1* 11/2010 Cohn ..................... G08B 29/02
700/90
2012/0188997 A1* 7/2012 Zakrzewski .......... H04J 3/0667
370/350
(Continued)

Primary Examiner — Emily C Terrell
Assistant Examiner — Pameshanand Mahase
(74) Attorney, Agent, or Firm — Armis IP Law, LLC

(57) ABSTRACT

A technician assistance application aids installation and diagnostics for an automated home monitoring system often referred to as an "Intelligent Home" system. The monitoring system includes a plurality of security sensor devices deployed around a dwelling and responsive to a monitoring application on a central computing device. The central computing device provides an on-site console for gathering signals from the security sensors and forwarding the gathered signals to a monitoring station or central office. The central office interprets the received signals to identify an anomaly or other signal consistent with a need to notify first responders or otherwise trigger an alarm. In addition to basic intrusion and fire protection, the monitoring system may monitor a variety of other non-emergency aspects such as lights, visual camera signals, door locks and environmental conditions.

23 Claims, 8 Drawing Sheets

(51) Int. Cl.
*H04W 4/18* (2009.01)
*G08B 25/08* (2006.01)
*H04L 12/26* (2006.01)

(56) References Cited

U.S. PATENT DOCUMENTS

| | | | |
|---|---|---|---|
| 2013/0024800 A1* | 1/2013 | Sundriyal | G08B 25/14 715/772 |
| 2013/0131840 A1* | 5/2013 | Govindaraj | G05B 19/41865 700/19 |
| 2014/0266699 A1* | 9/2014 | Poder | G08B 25/001 340/539.13 |
| 2015/0262474 A1* | 9/2015 | Olczak | G08B 29/185 340/506 |
| 2016/0042206 A1* | 2/2016 | Pesavento | H01Q 1/2216 235/385 |

\* cited by examiner

HOME AUTOMATION SYSTEM DEPLOYMENT

BACKGROUND

Conventional home security systems protect a dwelling by monitoring entry paths such as doors and windows, and typically alert first responders by initiating a telephone call over traditional telephone (telco) lines. As with many other technologies, however, Internet capabilities have been employed to enhance the underlying detection and notification capabilities provided by such security systems. Modern systems promote "home automation" functions, which allow control of other aspects such as HVAC (heating/ventilation/air conditioning) control, fire detection, and video monitoring in addition to traditional perimeter security provided by a "burglar alarm."

SUMMARY

A technician assistance application aids installation and diagnostics for an automated home monitoring system often referred to as an "Intelligent Home" system. The monitoring system includes a plurality of security sensor devices deployed around a dwelling and responsive to a monitoring application on a central computing device. The central computing device provides an on-site console for gathering signals from the security sensors, determining an appropriate response, and forwarding the gathered signals to a monitoring station or central office for notification of appropriate first responders (police, fire, etc.). Alternatively the central office may interprets the received signals based on the type of security sensor to identify an anomaly or other signal consistent with a need to notify first responders or otherwise trigger an alarm. In addition to basic intrusion and fire protection, the monitoring system may monitor a variety of other non-emergency aspects such as lights, visual camera signals, door locks and environmental conditions.

The monitoring system includes multiple security sensors, such as for door/window closure, smoke and heat, motion detection, video/image capture, temperature, and may even control and monitor advanced devices for selective entry such as fingerprint/palm scanners, facial recognition, retina scans, and lock control. Other monitored devices may extend to resource control, such as HVAC and valves for water/gas/oil control. In short, robust home monitoring and automation may be achieved, and increases the number of security sensors and responsive devices coupled to the on-site console. Configurations herein are based, in part, on the observation that substantial security sensors may be coupled to the on-site console in the monitoring system covering a particular home, dwelling or residence. Unfortunately, conventional approaches to installation of the monitoring system may involve substantial manual intervention by a technician to ensure proper coupling of the security sensors to the on-site console, and connectivity from the on-site console to the central office. The technician is required to manually operate or trigger each security sensor or sensing device, and initiate a voice call to the central office to verify successful receipt of the signal from the security sensor. In a large installation with many security sensors, the individual manual calls tend to drive up installation time substantially and result in increased error rates and required rework.

Accordingly, configurations herein substantially overcome the above-described shortcomings of conventional monitoring systems by invoking an installation and diagnostic application (app) for providing a link from each individual security sensor to the on-site console, and a network connection from the on-site console to the central office or other monitoring facility, to allow quick iteration through each of the security sensors and receive an acknowledgement from the central office indicating signal receipt. Monitoring may be performed by any suitable facility, such as a staffed response center, or a data center which may advance or forward a notification automatically. The installation and diagnostic application downloads from the central office to the on-site console, and establishes a link with each of the security sensors in the home. Alternatively, the app may be delivered with the deployed device, and selectively activated by appropriate personnel (the installation technician). Upon receipt of a signal from the security sensor, the app transmits the signal to the central office, and the central office responds with an acknowledgement, without requiring a separate communication (call) from the on-site technician to coordinate and match the various security sensors with the signals received at the central office. Substantial time is therefore saved on installation of a new system, and diagnostics of existing installed systems facilitated by iteratively generated exchanges from the security sensors and a resulting list of security sensor activity rendered on the on-site console.

In further detail, the system includes a home monitoring on-site console device having an interface to a plurality of security sensors in a monitored environment, and a network connection for providing a communication path from each of the identified security sensors to a central office, such that the communication path is configured for transmitting a value from an on-site console in the monitored environment based on a signal received from each sensor of the plurality of sensors. The home monitoring console device executes logic instructions for a rendering screen displaying a received acknowledgement indicative of associating, at the central office, each of the identified security sensors with a location defined by the monitored environment. A database defines the association for triggering an alert on behalf of the location based on signals received from any of the associated plurality of sensors. A processing device in the on-site console interprets and executes the logic instructions and directs the interface, network connection and rendering screen.

In a particular configuration disclosed herein, the technician assistance application is an ANDROID™ based application available on a home automation system and employed by technicians during day of installation and trouble calls to put a customer's account ON/OFF TEST, validate Alarm Test Signals and edit key customer information. The disclosed configuration may be included in a product suite that provides home security, monitoring, and home automation to subscribers.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

An example configuration below depicts an installation of security sensors coupled to an on-site console in a dwelling. This configuration depicts one of many arrangements of security sensors coupled to the on-site console having the app for completing the installation. The app may execute on any suitable computing platform, but is expected to be invoked on a small footprint tabletop, desktop or wall mountable device similar to a personal computing device such as a tablet, which may be affixed to a wall near an entry portal such as the front door to the dwelling. The on-site console may therefore be a small or portable computing device, such as an Android® based device or similar computing platform. Alternate configurations may employ other computing platforms and security devices than those depicted.

Figure 1:
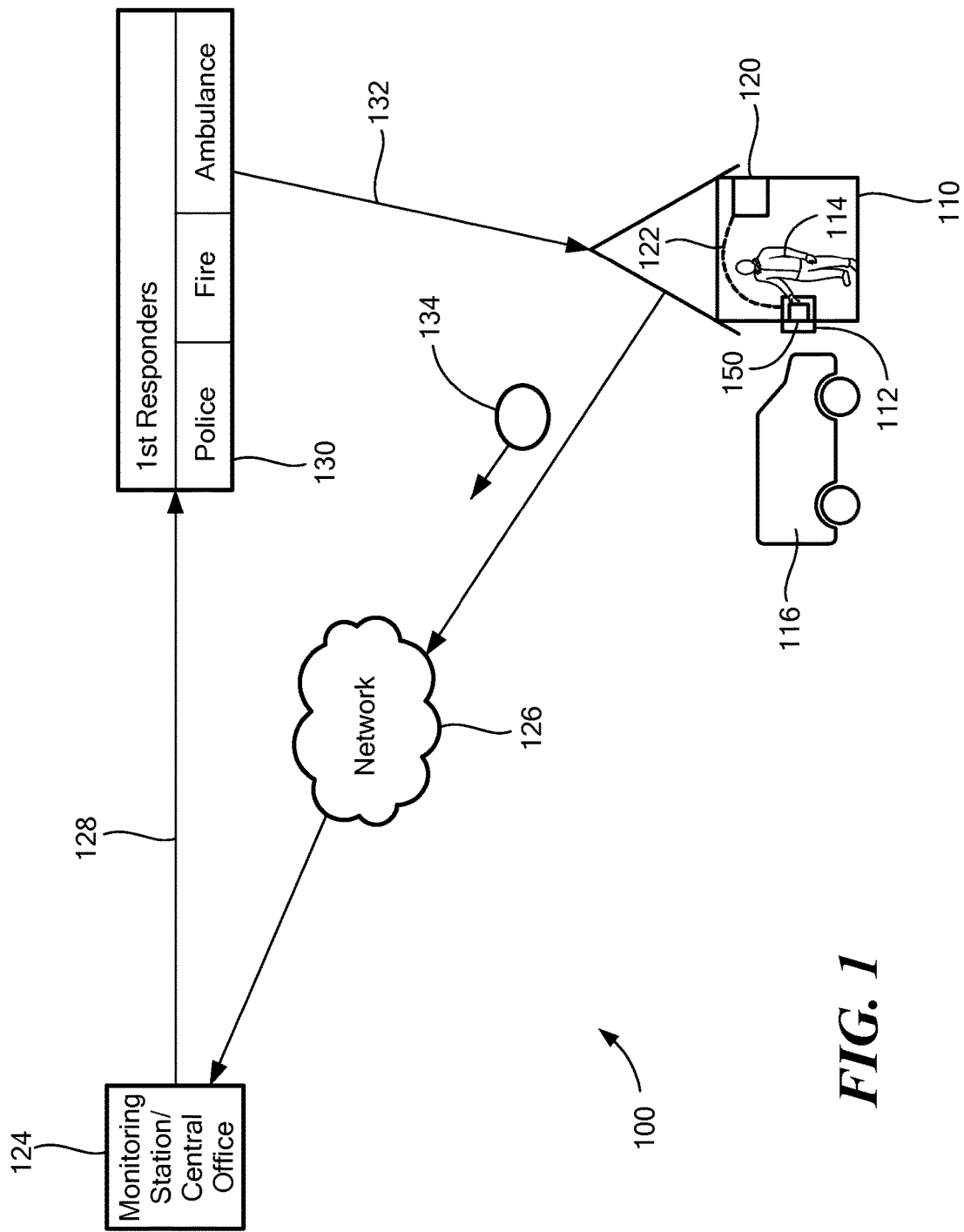
FIG. 1 is a context diagram of a home monitoring environment suitable for use with configurations herein.

FIG. 1 is a context diagram of a home monitoring environment 100 suitable for use with configurations herein. Referring to FIG. 1, in the home monitoring environment 100, a dwelling 110 employs an on-site console 112 for permitting a technician 114 to configure an installation by establishing and verifying a communication path 122 from a security sensor 120 to the on-site console 112 and from the on-site console 112 to a central office 124 via a public access network 126 such as the Internet. A typical installation employs many security sensors 120 of various types each of which needs to be verified for connectivity status to the central office 124. In response, the central office 124 initiates a communication 128 to a responsive entity 130, typically a first responder such as police, fire or ambulance dispatch similar to a "911" call. In an actual exigent situation, the responsive entity communication 128 results in a response 132 to the dwelling 110. Of course, during installation and configuration, triggered sensor data is invoked in a test mode, discussed further below, which interprets and selectively processes the sensor data 134 to distinguish diagnostic and exigent situations. Further, sensor data 134 may extend beyond a simple open/closed status applicable to a door, but may encompass environmental settings, video stream, and other suitable sensed data.

In the home monitoring environment 100, provider efficiency is improved by minimizing the number and duration of technician service calls, a so-called "truck roll" event that requires an equipment truck 116 and technician 114 at the dwelling 110. While generally a truck roll accompanies an initial installation, the duration is greatly reduced by an application 150 executing on the on-site console 112 for identifying, configuring and verifying connectivity of each security sensor 120 in the dwelling 110.

Figure 2:
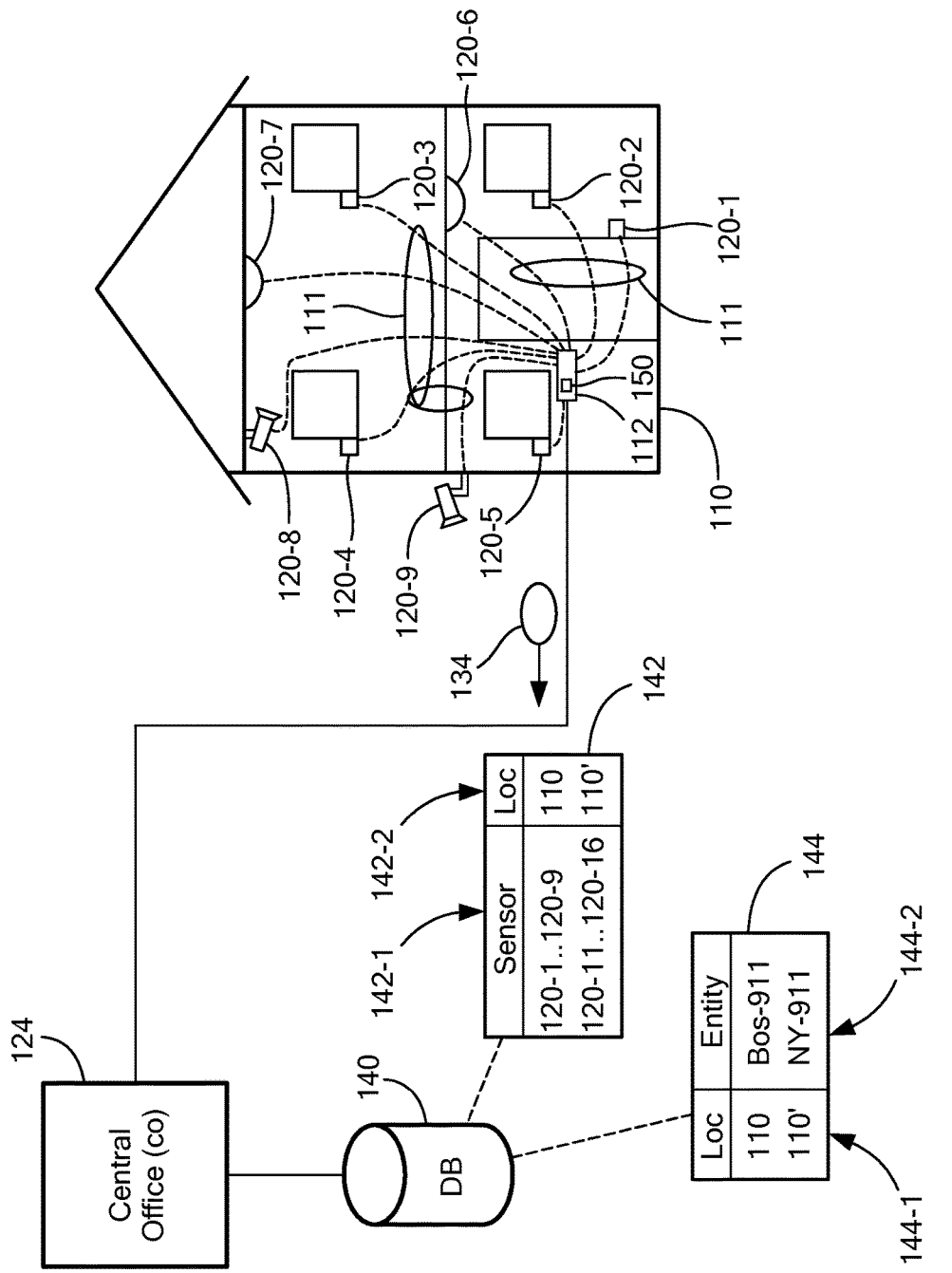
FIG. 2 shows the security monitoring system installed in the environment of FIG. 1.

FIG. 2 shows the security monitoring system installed in the environment of FIG. 1. A typical installation includes multiple security sensors 120-1 . . . 120 . . . 9 (120 generally). The sensors include door sensors 120-1, window sensors 120-2 . . . 120-5, smoke/CO (Carbon Monoxide) detectors 120-6, 120-7 and video cameras 120-8, 120-9. The security sensors 120 are not limited to data capture and read operations, but may also receive and implement remote commands, such as to turn lights on and off and lock/unlock doors. Other sensors may include window vibration/agitation sensors, environmental (HVAC) sensors, lock controls, and light controls, for example. In the simplest example, the door 120-1 and window 120-2 . . . 120-5 security sensors transmit a signal indicating open or closed. The security sensor could also transmit a temperature, CO concentration, video stream, or other suitable data item.

The installing technician 114 first needs to verify that each of the installed sensors is communicative with the central office 124, that is, that the signal transmitted from the security sensor 120 is received by the central office 124. Once all the security sensors 120 are verified, they are registered for the dwelling 110 location, along with an indication of the responsive entity (police, fire, homeowner) that should be notified in the event an anomaly indicated by the security sensor 120.

During the install, identification of the security sensors may include determining a bandwidth range transmitted by the security sensor, and receiving a signal in the determined bandwidth range indicative of data obtained by the security sensor. Different security sensors 120 and different vendors may transmit in specific ranges, and the received range and strength may also vary based on positioning of the security sensor 120. In contrast to conventional approaches, transmission parameters of the security sensor are adjustable at the on-site console 112, to allow the technician to adjust the installed sensor 120 for optimal positioning. Depending on the connectivity between the security sensors and the on-site console, intervening obstacles such as walls and furniture may determine optimal placement. For example, the security sensors may operate in a "line-of-sight" mesh network that expects a clear path to at least one adjacent security sensor. Alternatively, avoiding positioning near large metal object such as appliances may improve the RF or other transmission characteristics to allow the on-site 112 console to communication with the security sensors 120.

The application 150 on the on-site console 112 receives a signal from each of the security sensors 120, typically by a manual triggering by the technician 114. This may involve, for example, opening and closing doors and windows in the dwelling 110 to cause the security sensor 120 to change state and send a signal via a communications link 111. In contrast to conventional approaches, however, the on-site console 112 renders a history of security sensors triggered and corresponding signals 134 sent and acknowledged by the central office 124. Conventional approaches require a manual telephone call to the central office 124 to confirm receipt of a triggering signal, which was repeated for each sensor 120, often a time consuming process.

The communications link 111 is often a wireless link to the on-site console, such as through a mesh network or other suitable WiFi link under IEEE 802.11, as is known in the art. Alternatively, a wired connection may be employed. The application 150 identifies, by scanning or entry of an identifier, each security sensor 120. The application 150 transmits the identity of the on-site console 112 to the central office 124, typically via MAC (Media Access Control) ID, along with the identity of each security sensor 120. In the example arrangement, the on-site console 112 receives a message from the security sensor 120, such that the message is transmitted according to a first protocol defining a mesh network, such as a ZIGBEE® link according to IEEE 802.15.4. The application 150 transmits, according to a second protocol, a message to the central office 124, in which the message is indicative of successful receipt of the message from the security sensor and of the location for which the security sensor is to be associated. The second protocol is more suited to longer distances, and may be transported by the network 126 using a protocol such as TCP/IP.

The technician 114 can verify connectivity of each security sensor merely by inspection of the rendered history, discussed further below in FIG. 4, to ensure it corresponds to the manual activation of each sensor 120. A registration database (DB) 140 stores the sensor ID 142-1 and location 142-2 of the dwelling in a sensor table 142. Subsequently, a location table 144 associates the location 144-1 of the dwelling 110 with a response entity 144-2. The response entity may be further refined by the type of sensor data, such as associating the police department with a window sensor or the fire department with a smoke sensor. Further, the response entity may include other instructions, such as notifying the dwelling owner in the event a temperature sensor reports lower than 50 degrees, to indicate a failed boiler. Upon completion of security sensor registration being written to the table 142 and the location response entities being written to the location table 144, the application 150 has completed installation of the system, and the on-site console resumes monitoring (i.e. normal operation) of the dwelling 110. The application 150 may again be invoked by the technician on a successive call, if needed, either by reactivation and authenticating a resident version on the on-site console, or by downloading another instantiation of the application 150.

Figure 3A:
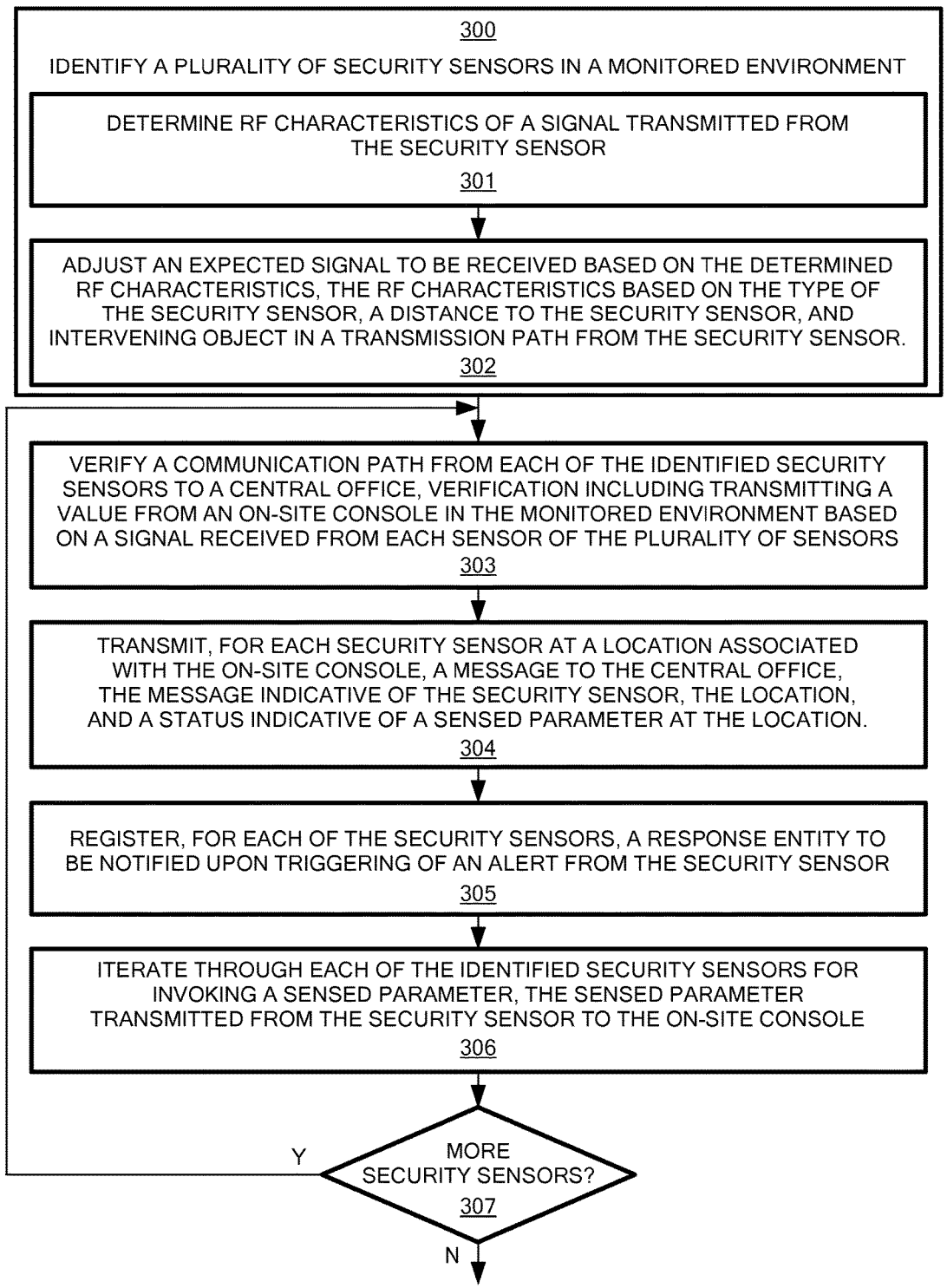
FIGS. 3a and 3b are a flowchart of the home monitoring application executing on the on-site console in the installation of FIG. 2.
Figure 3B:
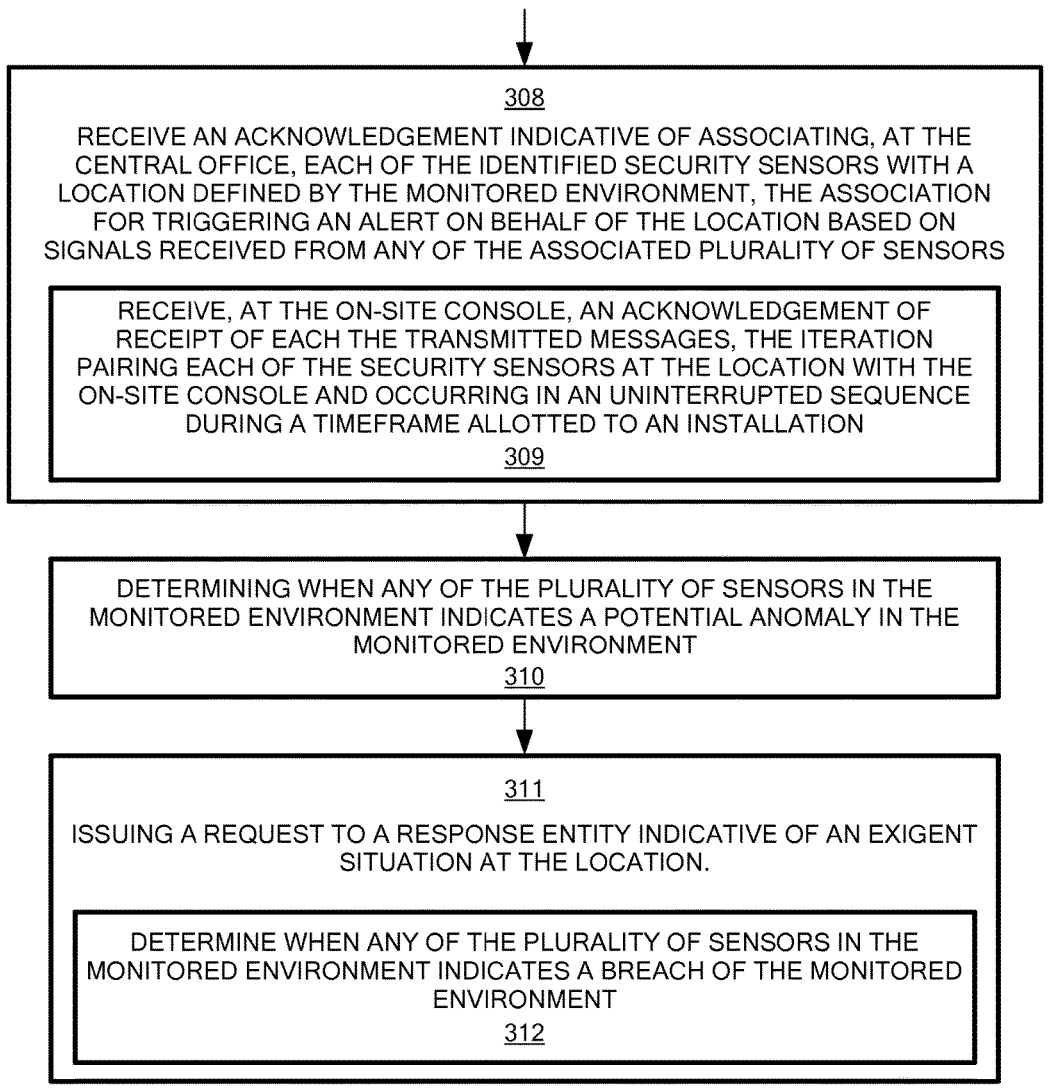

FIGS. 3a and 3b are a flowchart of the home monitoring application 150 executing on the on-site console in the installation of FIG. 2. Referring to FIGS. 1-3b, at step 300, the method for installing a security monitoring system includes identifying a plurality of security sensors 120 in the monitored environment 100. Identifying the security sensors may include determining RF characteristics of a signal transmitted from the security sensor, as depicted at step 301. RF characteristics such as signal strength and bandwidth range may be affected by sensor 120 placement, such as higher or lower on a door or window, and by intervening wall, doors and other building features of the dwelling 110. Using the app 150, the technician 114 adjusts the sensors to "fine-tune" an expected signal to be received at the on-site console 112. The signal received by the on-site console 112 may vary with position and intervening objects, as discussed above, and the technician 114 can adjust the installation accordingly. Other adjustments may be performed, for example depending on determined RF characteristics of the security sensors, in which the RF characteristics are based on the type of the security sensor, a distance to the security sensor, and intervening object in a transmission path from the security sensor, as disclosed at step 302. The on-site console 112 communicates with the security sensors 120 via a local mesh network, which in the example arrangement is a ZigBee based network. Alternate configurations may employ other mesh or similar LAN networks to cover the dwelling, and various transport mediums and network characteristics may be employed to provide an efficient and effective interconnection from the security sensors 120 to the on-site console 112. RF signal strength, signal bandwidth range, infrared wavelength, refraction from surroundings, carrier frequency and range, and other characteristics may become pertinent depending on the local network.

The technician 114 verifies a communication path from each of the identified security sensors 120 to the central office 124, such that verification includes transmitting a value from the on-site console 112 in the monitored environment 100 based on a signal received from each sensor 120 of the plurality of sensors 120-N, as depicted at step 303. This includes iterating, for each security sensor 120 at the dwelling location associated with the on-site console 112, a message transmission to the central office 124, in which the message is indicative of the security sensor 120, a type of the sensor, the location, and a status indicative of a sensed parameter at the location, as shown at step 304.

Associating the security sensors includes registering, for each of the security sensors 120, a response entity to be notified upon triggering of an alert from the security sensor 120, as depicted at step 305. The app 150 iterates through each of the identified security sensors 120 for invoking a sensed parameter, in which the sensed parameter is transmitted from the security sensor 120 to the on-site console 112, as disclosed at step 306. Sensed parameters may be open or closed signals for a door or window, scalar values such as temperature, or a more extensive data item such as a video stream. Operation of the door or window, for example, triggers a signal transmission that is verified in a sensor history rendering at the on-site console, discussed further below.

A check is performed, at step 307, to determine if all security sensors 120 have been registered and verified. If not, control reverts to step 303 for successive sensors 120. At step 308, the app 150 receives an acknowledgement indicative of associating, at the central office 124, each of the identified security sensors 120 with the location defined by the monitored environment 100. The association is recorded in the sensor table 142 for triggering an alert on behalf of the location based on signals 134 received from any of the associated plurality of sensors 120-N. Responses may be simple alarms, such as notifying police of a possible break-in for door or window sensors, or may involve further computation, such as receiving a temperature and comparing it to a maximum permissible low prior to alerting the homeowner.

During the installation, the app 150 receives, at the on-site console 112, an acknowledgement of receipt of each the transmitted messages 134, in which the iteration pairs each of the security sensors at the location with the on-site console to reflect each sensor 120. In response, the on-site console renders a received signal history report reflecting the recent actuations/triggers performed by the on-site technician. Rendering of the history report occurs in an uninterrupted sequence during a timeframe allotted to an installation, to allow the technician to trigger all security sensors 120-N and review the rendered history report to verify connectivity and operation during the single service call allotted to installation, as depicted at step 309.

Following successful installation, the on-site console 112 resumes a consumer mode for home automation and monitoring tasks, and the installation app 150 is disabled and/or uninstalled, as it is intended for technician use during installation and service diagnostics. In the consumer usage mode, the on-site console 112 determines when any of the plurality of sensors 120 in the monitored environment 100 indicates a potential anomaly in the monitored environment 100, as disclosed at step 310, and issues a request to a response entity indicative of a exigent situation at the location if a sensor 120 is triggered, as depicted at step 311. In a home security usage, this includes determining when any of the plurality of sensors in the monitored environment indicates a breach of the monitored environment, such as from an open signal from a door or window sensor, as depicted at step 312.

Upon successful installation and verification of security sensor 120 operation, a baseline or measurement of the signal from each security sensor 120 may be stored. The baseline provides an "RF snapshot" of effective operational parameters for the sensors upon installation. Successive diagnostic operations may benefit by comparing the baseline to current signals from the security sensors 120 to identify deviations. Environmental changes to the dwelling, such as movement of furniture and appliances therein, for example, may alter transmission characteristics of nearby security sensors 120 and may cause different RD characteristics to effect transmission the on-site console. Comparison of the baseline as installed with a successive snapshot may pinpoint sensors 120 that are operating differently. By capturing an indication of the signals received from the security sensors to identify operational parameters of successfully received signals, and storing the received signals as a baseline snapshot for comparison in future diagnostics. A technician on a future service call may retrieve the stored baseline snapshot, and compare the captured operational parameters from the successive time to the baseline snapshot to identify differences as a diagnostic or troubleshooting aid.

Figure 4:
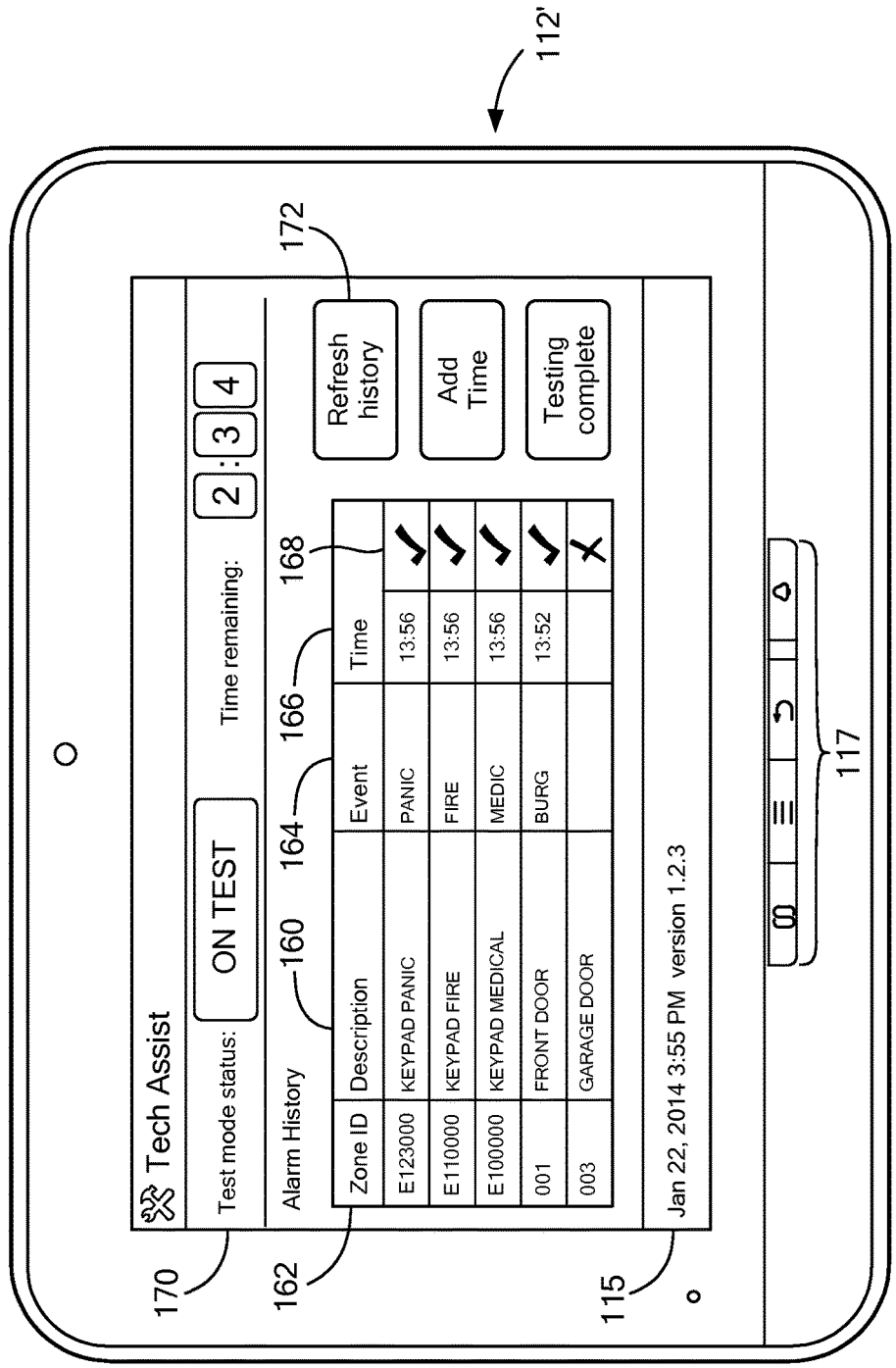
FIG. 4 is a diagram of the on-site console rendering an indication of security sensors in the installation of FIG. 2.

FIG. 4 is a diagram of the on-site console rendering an indication of security sensors in the installation of FIG. 2. Referring to FIGS. 2 and 4, the on-site console 112 takes the form of a portable computing device 112' such as a tablet. While the on-site console 112 is intended to be affixed in a permanent manner, the portable computing device 112' is better suited to space and power requirements. Upon invocation, the app 150 gathers the identity of each of the security sensors 120 associated with the location, and transmits the identity and the associated location to the central office 124 for updating a database 140 of locations, security sensors 120, and response entities 130 for each security sensor 120. A rendering screen 115 displays the sensor history information, and hard buttons 117 are available for system functions such as power and screen navigation, in addition to touch screen (soft) rendered buttons. A description column 160 describes each security sensor 120, and is included in a zone ID 162 which arranges the sensors 120 in groups. An event column 164 describes the data (message) 134 sent by the sensor, such as BURG (Burglary) for a front door open, and the time at which it occurred (col.166). A check column 168 allows the technician to indicate verification of the alarm message 134 sent, which coincides with the time based on when the sensor 120 was triggered. A test mode status 170 designates the alarm messages 134 as test messages for installation or diagnostics, and informs the central office 124 to not forward or alert a responsive entity 130, lest an installation result in a series of false alarms. The central office 124, in response to an indication of test mode, identifies the test mode for suppressing a call to a response entity based on a triggered alert.

In the example configuration, the technician causes the app 150 to generate test events by intentional triggering of the security sensors 120 associated with the location. The app receives an event history from the central office, such that the event history is indicative of the messages 134 received based on the triggered security sensors 120, and renders a check in the check column 168 to correlate the event history including triggered alerts from the security sensors 120. As various security sensors 120 are actuated, the app 150 accumulates an event history for each of the security sensors 120, in which the event history is based on a message indicative of a state change detected by the security sensor 120. The app 150 transmits at least a portion of the event history from one or more of the sensors 120 to the central office 124, such that the central office 124 is configured for correlating the events in the event history with the test mode. In response to the test mode, the central office 124 indicates to the app 150 successful transmission of an alert from the security sensor 120 and suppresses notification of a response entity 130 based on the security sensor. A refresh history button 172 may be invoked to update the rendered history with recent security sensor 120 activations. Depending on the number of individual security sensors 120 at the dwelling 110, the technician may trigger all sensors in a single history report, or may perform phases interleaved with a refresh of history to make the task more manageable.

Figure 5:
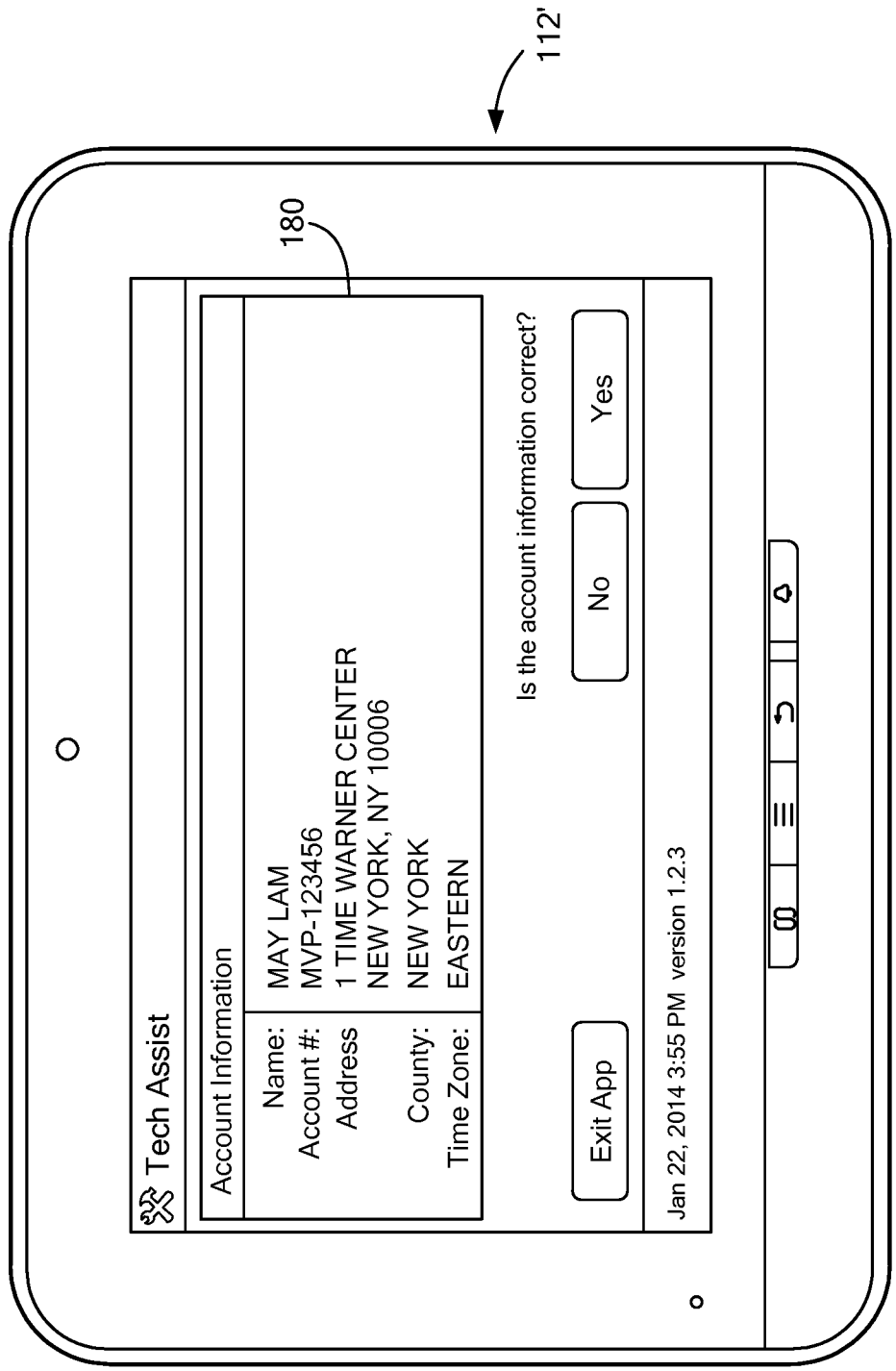
FIG. 5 is a diagram of the on-site console rendering an indication of the response entities associated with the location of the installation of FIG. 2.

FIG. 5 is a diagram of the on-site console rendering an indication of the response entities associated with the location of the installation of FIG. 2. The app 150 confirms a location 180 to be associated with each of the security sensors in the dwelling 110. The database 140 stores the location 180 in the location table 144 so that responsive entities 130 may be dispatched to a proper location.

Figure 6A:
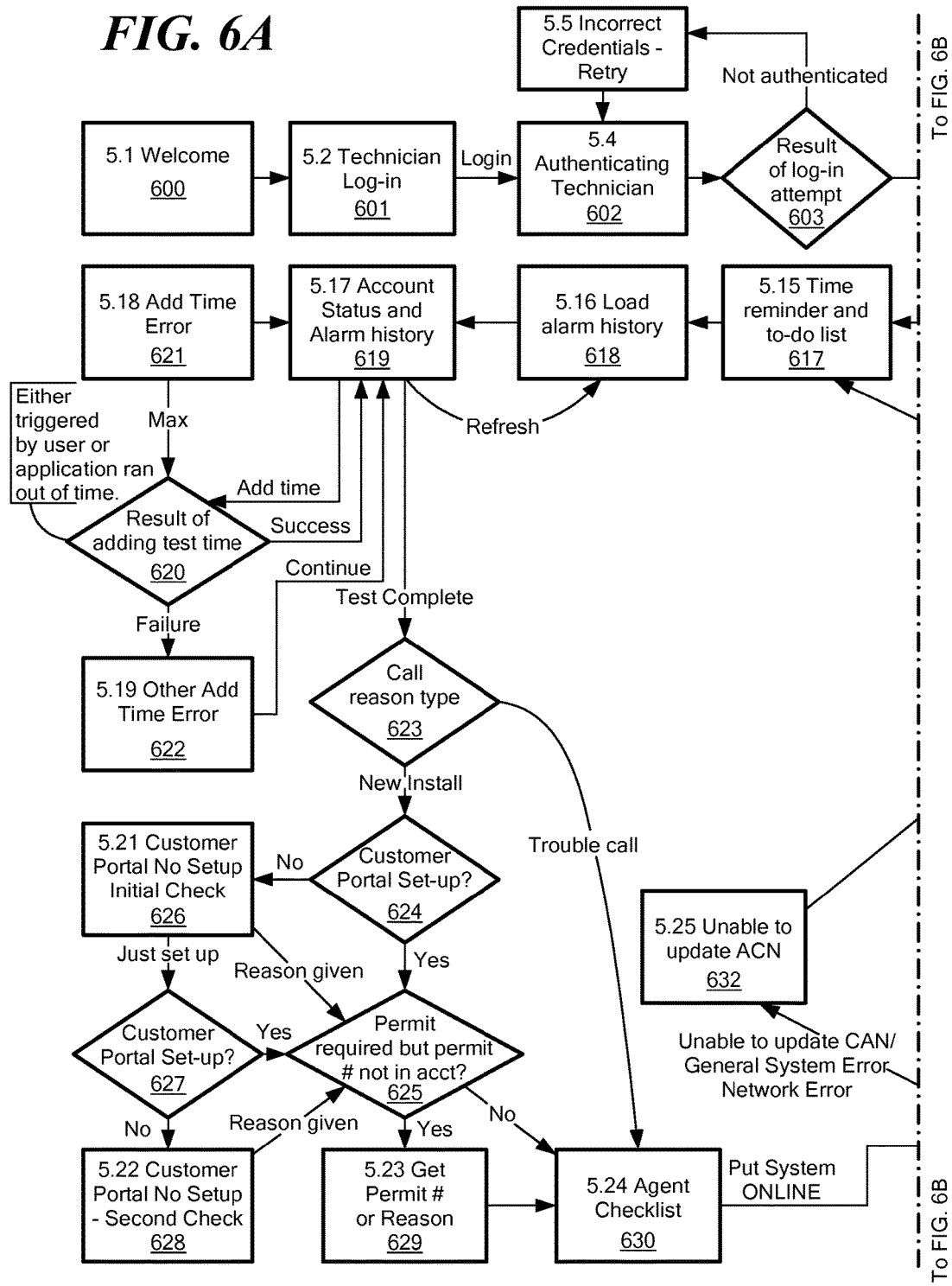
FIG. 6A and FIG. 6B shows a flowchart of a full install in the environment of FIGS. 1 and 2 invoking the screen rendering and logic of FIGS. 3-5.
Figure 6B:
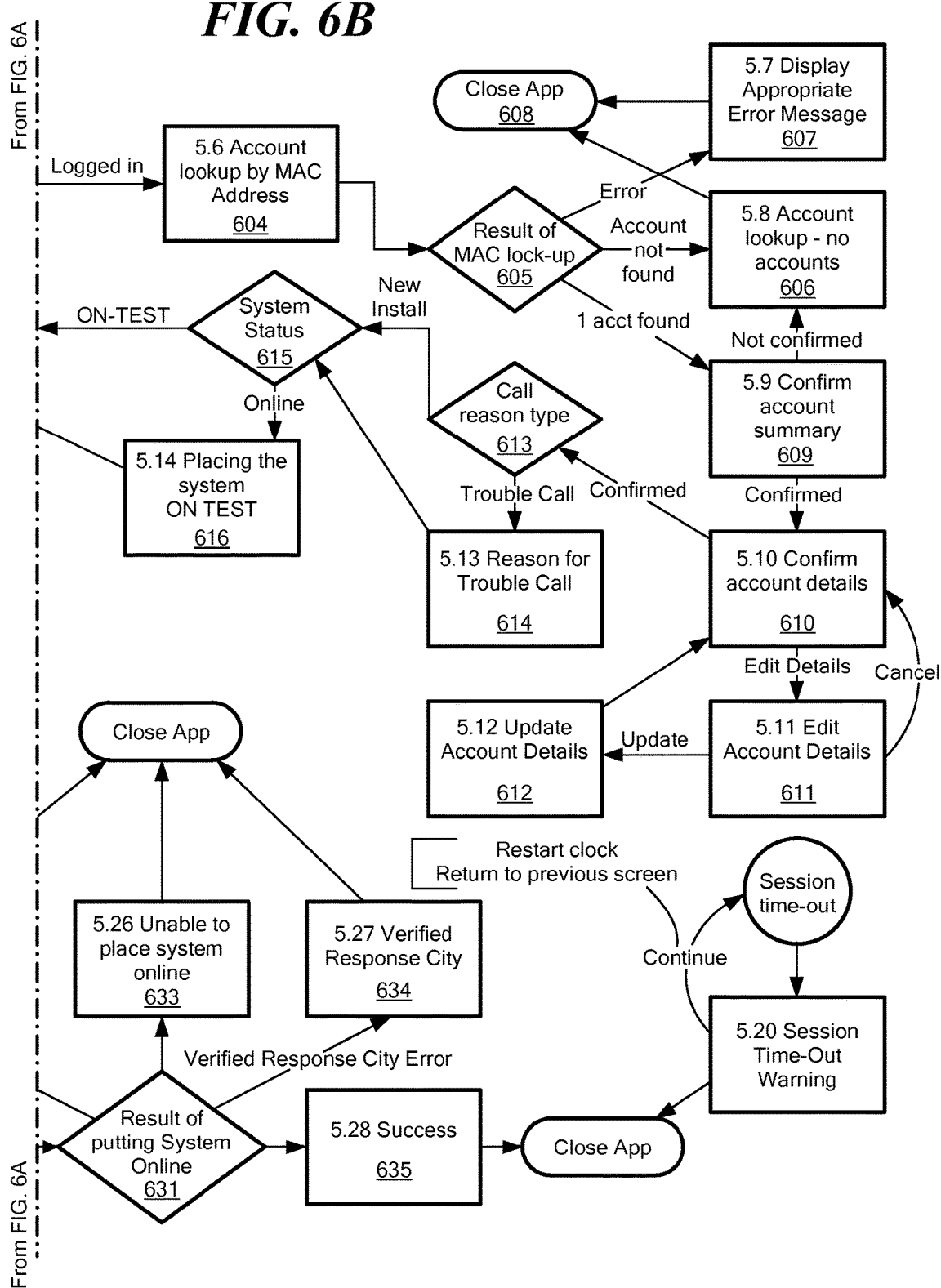

FIGS. 6A and 6B shows a flowchart of a full install in the environment of FIGS. 1 and 2 invoking the screen rendering and logic of FIGS. 3-5. Referring to FIGS. 1-6B, FIG. 6A and FIG. 6B shows a rendered screen flow as a technician progresses through an install or diagnostic call. Steps 600-603 depict an app 150 welcome screen and authentication of an authorized technician. The app 150 is intended for use by a trained technician, and not for user self-diagnostics or phone support. Steps 604-608 confirm the identity of the on-site console 112 via MAC ID or other account verification. Following account verification at step 609, the location verification screen of FIG. 5 is rendered to confirm the service location of the on-site console, as shown at steps 610-612 to update the dwelling 110 location. The location is employed by responsive entities in the case of an exigent situation, hence accuracy is important.

Initial installation or service call (i.e. truck roll event) is clarified at steps 613-614, and test mode 170 established at steps 615 and 616 to accommodate triggering of security sensors 120. Timing expectations and (if a service call) diagnostic procedures are established at step 617. Security sensor validation and registration is performed and/or confirmed at steps 618-622, as shown in FIG. 4, to refresh the rendered history and allocate additional time as needed. Additional test mode time is significant because this represents the period of nonresponsiveness to alarms. Actual emergencies that happened to occur during this mode might be ignored, hence it is important not to allow test mode to persist any longer than necessary.

Call reason is reiterated at step 623, and executed diagnostic procedures are confirmed at step 630. In the case of a new install, necessary regulatory constraints such as permitting are addressed at steps 624-629, and control resumes at step 630. The on-site service call is completed at step 631, and nonoperational scenarios are covered at steps 632-634. The app 150 renders a successful termination screen at step 635.

It will be appreciated by those skilled in the art that alternate configurations of the disclosed invention, particularly with respect to programmed logic and/or control features disclosed above, include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the apparatus and methods defined herein have been particularly shown and described with references to embodiments thereof, it will be understood by those skilled in the art that various changes in form and details may be made therein without departing from the scope of the invention encompassed by the appended claims.

The invention claimed is:

1. A method for installing a security monitoring system, comprising:
   identifying, at an application launched on an onsite console, a plurality of security sensors in a monitored environment;
   determining RF characteristics of a signal transmitted from a security sensor of the plurality of security sensors; and
   adjusting an expected signal to be received at the onsite console via a wireless communication medium from the security sensor based on the determined RF characteristics, the RF characteristics based on the type of the security sensor, a distance to the security sensor, and intervening objects in a transmission path from the security sensor;
verifying a communication path from each of the identified security sensors to a central office via the onsite console, verification including:
   i: transmitting a value from an on-site console in the monitored environment based on a signal received from each sensor of the plurality of sensors;
   ii: transmitting an identity of the onsite console, the on-sire console identity stored with the value in a registration database for associating the sensor with the monitored environment in which the onsite console is disposed; and
   iii: receiving an acknowledgement indicative of associating, at the central office, each of the identified security sensors with a location defined by the monitored environment, the association for triggering an alert on behalf of the location based on signals received from any of the associated plurality of sensors.

2. The method of claim 1 further comprising:
   iterating, for each security sensor at a location associated with the on-site console, a message transmission to the central office, the message indicative of the security sensor, the location, and a status indicative of a sensed parameter at the location; and
   receiving, at the on-site console, an acknowledgement of receipt of each the transmitted messages, the iteration pairing each of the security sensors at the location with the on-site console and occurring in an uninterrupted sequence during a timeframe allotted to an installation.

3. The method of claim 2 wherein identifying the security sensors includes:
   determining a bandwidth range transmitted by the security sensor; and
   receiving a signal in the determined bandwidth range indicative of data obtained by the security sensor.

4. The method of claim 1 further comprising:
   determining when any of the plurality of sensors in the monitored environment indicates a potential anomaly in the monitored environment; and
   issuing a request to a response entity indicative of a exigent situation at the location.

5. The method of claim 1 further comprising:
   determining when any of the plurality of sensors in the monitored environment indicates a breach of the monitored environment; and
   issuing a request to a response entity indicative of a exigent situation at the location.

6. The method of claim 1 wherein associating the security sensors further comprises:
   registering, for each of the security sensors, a response entity to be notified upon triggering of an alert from the security sensor.

7. The method of claim 6 further comprising identifying a test mode, the test mode for suppressing a call to a response entity based on a triggered alert.

8. The method of claim 7 further comprising:
   accumulating an event history for a security sensor, the event history based on a message indicative of a state change detected by the security sensor;
   transmitting at least a portion of the event history to the central office, the central office configured for correlating the events in the event history with the test mode;
   in response to the test mode, denoting successful transmission of an alert from the security sensor and suppressing notification of a response entity based on the security sensor.

9. The method of claim 8 further comprising:
   generating test events by intentional triggering of the security sensors associated with the location;
   receiving an event history from the central office, the event history indicative of messages received based on the triggered security sensors; and
   correlating an event history including triggered alerts from the security sensors.

10. The method of claim 8, further comprising accumulating an event history for a plurality of state changes of the security sensor received by the central office.

11. The method of claim 1 wherein transmitting values for verifying the communications path includes iterating through each of the identified security sensors for invoking a sensed parameter, the sensed parameter transmitted from the security sensor to the on-site console.

12. The method of claim 11 further comprising:
   receiving a message from the security sensor, the message transmitted according to a first protocol; and transmitting, according to a second protocol, a message to the central office, the message indicative of successful receipt of the message from the security sensor and of the location for which the security sensor is to be associated.

13. The method of claim 1 further comprising:
capturing an indication of the signals received from the security sensors to identify operational parameters of successfully received signals; and
storing the received signals as a baseline snapshot for comparison in future diagnostics.

14. The method of claim 13 further comprising:
capturing an indication of the signals received from the security sensors to identify operational parameters of the signals at a successive time from initial installation;
retrieving the stored baseline snapshot; and
comparing the captured operational parameters from the successive time to the baseline snapshot to identify differences.

15. The method of claim 1, further comprising receiving a signal of an adjusted frequency from the security sensor, and storing the adjusted frequency in association with the security sensor.

16. The method of claim 1 further comprising establishing a wireless communication path between the security sensors and the onsite console, and establishing a wired communication path between the onsite console and the central office.

17. A home monitoring device, comprising:
a wireless interface to a plurality of security sensors in a monitored environment, the wireless interface responsive to an application launched on an onsite console;
a network connection for providing a communication path from each of the identified security sensors to a central office via the onsite console, the communication path configured for transmitting a value from an on-site console in the monitored environment based on a signal received from each security sensor of the plurality of security sensors, and for
transmitting an identity on the onsite console, the on-sire console identity stored with the value in a registration database for associating the sensor with the monitored environment in which the onsite console is disposed the on-site console responsive to determined RF characteristics of a signal transmitted from each of the security sensors,
and operable for adjusting an expected signal to be received at the onsite console via a wireless communication medium based on the determined RF characteristics, the RF characteristics based on the type of the security sensor, a distance to the security sensor, and intervening objects in a transmission path from the security sensor;
a rendering screen for displaying a received acknowledgement indicative of associating, at the central office, each of the identified security sensors with a location defined by the monitored environment, the association for triggering an alert on behalf of the location based on signals received from any of the associated plurality of sensors; and
a processing device for interpreting logic instructions directing the interface, network connection and rendering screen.

18. The device of claim 17 wherein the processing device is configured to:
iterate, for each security sensor at a location associated with the on-site console, a message transmission to the central office, the message indicative of the security sensor, the location, and a status indicative of a sensed parameter at the location;
the network connection configured to receive, at the on-site console, an acknowledgement of receipt of each the transmitted messages, the iteration pairing each of the security sensors at the location with the on-site console and occurring in an uninterrupted sequence during a timeframe allotted to an installation.

19. The device of claim 18 wherein the rendering screen is adapted to identify a test mode, the test mode for suppressing a call to a response entity based on a triggered alert.

20. The device of claim 19 wherein the logic instructions are configured for:
accumulating an event history for a security sensor, the event history based on a message indicative of a state change detected by the security sensor; and
the network connection adapted to transmitting at least a portion of the event history to the central office, the central office configured for correlating the events in the event history with the test mode, the central office responsive to the test mode for denoting successful transmission of an alert from the security sensor and suppressing notification of a response entity based on the security sensor.

21. The device of claim 17 wherein the processing device is further configured to:
generate test events from intentional triggering of the security sensors associated with the location;
receive an event history from the central office, the event history indicative of messages received based on the triggered security sensors; and
correlate an event history including triggered alerts from the security sensors based on a rendering of the event history and input attesting to triggered sensors.

22. The device of claim 17 wherein the network connection is for transmitted values for verifying the communications path, and iterating through each of the identified security sensors for invoking a sensed parameter, the sensed parameter transmitted from the security sensor to the interface on the on-site console,
the interface configured for receiving a message from the security sensor, the message transmitted according to a first protocol; and
the network connection configured for transmitting, according to a second protocol, a message to the central office, the message indicative of successful receipt of the message from the device and of the location for which the device is to be associated.

23. A system for security monitoring of a dwelling, comprising:
an on-site console operable to launch an application for identifying a plurality of security sensors in a monitored environment, the on-site console responsive to determined RF characteristics of a signal transmitted from a security sensor of the plurality of security sensors, and operable for adjusting an expected signal to be received at the onsite console via a wireless communication medium from the security sensor based on the determined RF characteristics, the RF characteristics based on the type of the security sensor, a distance to the security sensor, and intervening objects in a transmission path from the security sensor;
a network connection for verifying a communication path from each of the identified security sensors to a central office via the onsite console, verification including transmitting a value from an on-site console in the monitored environment based on a signal received from each sensor of the plurality of sensors, and transmitting an identity of the onsite console, the on-sire console identity stored with the value in a registration database for associating the sensor with the monitored environment in which the onsite console is disposed; and a central office for associating, at the central office, each of the identified security sensors with a location defined by the monitored environment, the association for triggering an alert on behalf of the location based on signals received from any of the associated plurality of sensors, transmitting the values for verifying the communications path includes iterating through each of the identified security sensors for invoking a sensed parameter, the sensed parameter transmitted from the security sensor to the on-site console.

* * * * *